(12) United States Patent
Benner et al.

(10) Patent No.: US 6,798,381 B2
(45) Date of Patent: Sep. 28, 2004

(54) SYSTEM AND METHOD FOR MEASUREMENT DOMAIN DATA ASSOCIATION IN PASSIVE COHERENT LOCATION APPLICATIONS

(75) Inventors: Robert H. Benner, Gaithersburg, MD (US); Joseph Sawyer, Gaithersburg, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/138,507

(22) Filed: May 6, 2002

(65) Prior Publication Data

US 2003/0048224 A1 Mar. 13, 2003

Related U.S. Application Data

(60) Provisional application No. 60/288,450, filed on May 4, 2001.

(51) Int. Cl.[7] ................................................ G01S 3/02
(52) U.S. Cl. ...................................................... 342/451
(58) Field of Search ................................ 342/450, 451, 342/452, 457

(56) References Cited

U.S. PATENT DOCUMENTS

| | | |
|---|---|---|
| 3,242,487 A | 3/1966 | Hammack |
| 3,270,340 A | 8/1966 | Hammack |
| 3,286,263 A | 11/1966 | Hammack |

(List continued on next page.)

FOREIGN PATENT DOCUMENTS

| | | |
|---|---|---|
| DE | 38 18 813 C | 6/1999 |
| FR | 2 776 438 A | 9/1999 |

OTHER PUBLICATIONS

Schwenke, Roger W., Sensitivity Analysis of an Estimator–Correlator for the Detection of Spread Targets with Multiple Discrete Highlights, The Pennsylvania State University, Dec. 2000, pp 1–13.

Holt, J.M. et al., Midas–W: a workstation–based incoherent scatter radar data acquisition system, Massachusetts Institute of Technology, Jun. 2000, pp 1231–1241.

Martinez, David R., Application of Parallel Processors to Real–Time Sensor Array Processing, MIT Lincoln Laboratory, pp 1–7.

Jianqi, Wu, et al., Researches of a New Kind of Advanced Metric Wave Radar, East of China Research Institute of Electronic Engineering, 1999, pp. 194–197.

International Search Report, dated Jan. 22, 2003, for Application No. PCT/US02/14067.

Howland, P.E., Target Tracking Using Television–Based Bistatic Radar, IEE Proc.–Radar, Sonar Navig., vol. 146, No. 3, Jun. 1999.

*Primary Examiner*—Dao Phan
(74) *Attorney, Agent, or Firm*—Marsh Fischmann & Breyfogle LLP

(57) ABSTRACT

A system and method for measurement domain data association in a passive coherent location system is disclosed. According to the system and method, detection reports are received and associated with line tracks. The detection reports correlate to target signals received at the passive coherent location system. Measurements of the detection report correlate to the data of the target signals. A line track state estimation function associates new detection reports with the line tracks and estimates update states for the line tracks. A signal type is determined. Kalman filters are selected for the measurements according to the signal type. Measurement residuals are computed for the detection reports according to the Kalman filters. The detection reports are selected for association with the line tracks according to the residuals. The line tracks can be merged or terminated during updates according to specific criteria. Further, new line tracks are initialized as new targets are detected.

41 Claims, 11 Drawing Sheets

U.S. PATENT DOCUMENTS

| | | | |
|---|---|---|---|
| 3,573,611 A | 4/1971 | Bergemann et al. | 324/57 |
| 3,706,096 A | 12/1972 | Hammack | |
| 3,786,509 A | 1/1974 | Applebaum et al. | 343/17.1 |
| 3,795,911 A | 3/1974 | Hammack | 343/9 |
| 3,972,000 A | 7/1976 | Desblache et al. | 329/105 |
| 4,114,153 A | 9/1978 | Neidell | 343/9 |
| 4,994,809 A | 2/1991 | Yung et al. | 342/108 |
| 5,001,650 A * | 3/1991 | Francis et al. | 364/516 |
| 5,192,955 A | 3/1993 | Hoang | 342/80 |
| 5,252,980 A | 10/1993 | Gray et al. | 342/59 |
| 5,381,156 A | 1/1995 | Bock et al. | 342/126 |
| 5,414,643 A | 5/1995 | Blackman et al. | |
| 5,451,960 A | 9/1995 | Kastella et al. | 342/59 |
| 5,525,995 A | 6/1996 | Benner | 342/90 |
| 5,604,503 A | 2/1997 | Fowler et al. | 342/378 |
| 5,623,267 A | 4/1997 | Wurman | 342/26 |
| 5,798,942 A | 8/1998 | Danchick et al. | |
| 5,909,189 A | 6/1999 | Blackman et al. | |
| 5,912,640 A | 6/1999 | Bradford et al. | 342/99 |
| 5,943,170 A | 8/1999 | Inbar et al. | 359/561 |
| 5,990,831 A | 11/1999 | McDowell | 342/378 |
| 6,031,879 A | 2/2000 | Pace et al. | 375/316 |
| 6,052,421 A | 4/2000 | Richardson et al. | 375/346 |
| 6,057,877 A | 5/2000 | Limberg | 348/21 |
| 6,133,873 A | 10/2000 | Krasner | 342/357.12 |

* cited by examiner

SYSTEM AND METHOD FOR MEASUREMENT DOMAIN DATA ASSOCIATION IN PASSIVE COHERENT LOCATION APPLICATIONS

CROSS REFERENCE TO RELATED APPLICATIONS

This application claims benefit of U.S. Provisional Patent Application No. 60/288,450 entitled "System and Method for Measurement Domain Data Association for PCL Applications," filed May 4, 2001, which is hereby incorporated by reference.

BACKGROUND OF THE INVENTION

1. Field of the Invention

The present invention relates to a passive coherent location ("PCL") radar system and method, and more particularly, to a system and method for measurement domain data association, also referred to as line tracking, for PCL radar applications.

2. Discussion of the Related Art

PCL radar systems may be represented by a multistatic radar system. A multistatic radar system has many receivers that are separated from one or more transmitters. The radiated signal from a transmitter arrives at a receiver via two separate paths. One path may be a direct path from the transmitter to the receiver, and the other path may be a target path that includes an indirect path from the transmitter to a target to the receiver. Measurements may include a total path length, or transit time, of the target path signal, the angle of arrival of the target path signal, and the frequency of the direct and target path signals. A difference in frequency may be detected according to a doppler effect if the target is in motion.

Knowledge of the transmitted signal is desirable at the receiver if information is to be extracted from the target path signal. The transmitted frequency is desired to determine the doppler frequency shift. A time or phase reference also is desired if the total scattered path length is to be determined. The frequency reference may be obtained from the direct signal. The time reference also may be obtained from the direct signal provided the distance between the transmitter and the receiver is known.

Multistatic radar systems may be capable of determining the presence of a target within the coverage of the radar, the location of the target position, and a velocity component, or doppler, relative to the radar. The process of locating the target position may include a measurement of a distance and the angle of arrival. The measurement determination of distance relative to the receiving site may require both the angle of arrival at the receiving site and the distance between transmitter and receiver. If the direct signal is available, it may be used as a reference signal to extract the doppler frequency shift.

In PCL radar systems, transmitters may be known as illuminators. Illuminators may be wideband sources of opportunities that include commercial frequency modulated ("FM") broadcast transmitters and/or repeaters, commercial high-definition television ("HDTV") broadcast transmitters and/or repeaters, and the like. Efficient techniques for wideband signal pre-detection processing and co-channel interference mitigation exist. Known approaches include an array of antennas used to receive the source of opportunity to be exploited, such as the primary illuminator, and any other co-channel signals present in the environment.

The different signals and their measurement data should be associated with the appropriate target. If the target association does not exist, then a new tracking may have to be implemented for the target. Conversely, old trackings should be eliminated from the system if updates are no longer being received. More efficient and expediant measurement data association may improve target tracking in PCL systems.

SUMMARY OF THE INVENTION

Accordingly, the present invention is directed to PCL applications and signal processing.

According to an embodiment, a method for associating a detection report having measurements to a line track is disclosed. The line track correlates to a signal reflected from a target detected by a passive coherent location system. The method comprises estimating a line track state vector from the measurements using a set of Kalman filters. The method also includes initializing the line track.

According to another embodiment, a method for associating measurement data to a line track correlating to a target is disclosed. A target signal is reflected from the target and is received by a passive coherent location system. The method includes determining a signal type for the signal. The method also includes converting the measurement data to filter data according to the signal type. The method also includes selecting a set of Kalman filters for the filter data according to the signal type. The method also includes propagating the line track. The method also includes identifying a detection report for the line track according to the measurement data. The method also includes computing measurement residuals and residual variances for the detection report according to the Kalman filters. The method also includes selecting the detection report for association with the line track according to the residuals.

According to an embodiment, a system for measurement data association of detection reports to a line track within a passive coherent location system is disclosed. The detection reports correlate to target signals received at the passive coherent location system. The system includes a state estimation means to associate new detection reports with existing line tracks and to estimate update states for extending line tracks. The system also includes a line track merge means to merge line tracks. The system also includes a line track termination means to terminate line tracks according to a specified criteria. The system also includes a line track initialization means to initiate new line tracks for unassociated detection reports.

According to another embodiment, a method for estimating line track states with detection association in a passive coherent location system is disclosed. The passive coherent location system receives target signals reflected from targets. The target signals have measurement valves. The method includes identifying a set of potential detection reports. The detection reports comprise measurement valves. The method also includes computing measurement residuals and residual variances for the measurement valves. The method also includes selecting candidate reports for line tracks from the set of potential detection reports according to the measurement residuals. The method also includes applying thresholds to the candidate detection reports. The method also includes associating the candidate detection reports passing the thresholds to the line tracks.

According to an embodiment, a method for associating new detection reports with existing line tracks in a passive coherent location system is disclosed. The method also includes gating a detection report-line track pair. The method also includes computing a score for the detection report-line track pair. The method also includes assigning a detection report of the detection report-line track pair to a line track of the detection report-line track pair according to the score.

According to an embodiment, a method for merging line tracks within a passive coherent location system is disclosed. The line tracks correlate to a target. The method also includes determining a list of line tracks and line track pairs. The method also includes calculating a measurement residual for each line track pair within the list. The method also includes determining merge criteria for the each line track pair. The method also includes comparing the measurement residual with gates correlating to the merge criteria. The method also includes removing a line track from the possible line track pair that satisfies the merge criteria.

According to an embodiment, a method for terminating a line track within a passive coherent location system is disclosed. The method also includes determining a termination criteria. The method also includes terminating the line track when the line track achieves the termination criteria.

According to an embodiment, a method for initializing new line tracks within a passive coherent location system is disclosed. The method also includes determining a configuration parameter for a new line track. The method also includes selecting an initialization process according to the configuration parameter. The method also includes performing the initialization process. The method also includes initializing a filter state of the new line track.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which is included to provide further understanding of the invention and is incorporated in and constitutes a part of this specification, illustrates embodiments of the present invention and together with the description serves to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
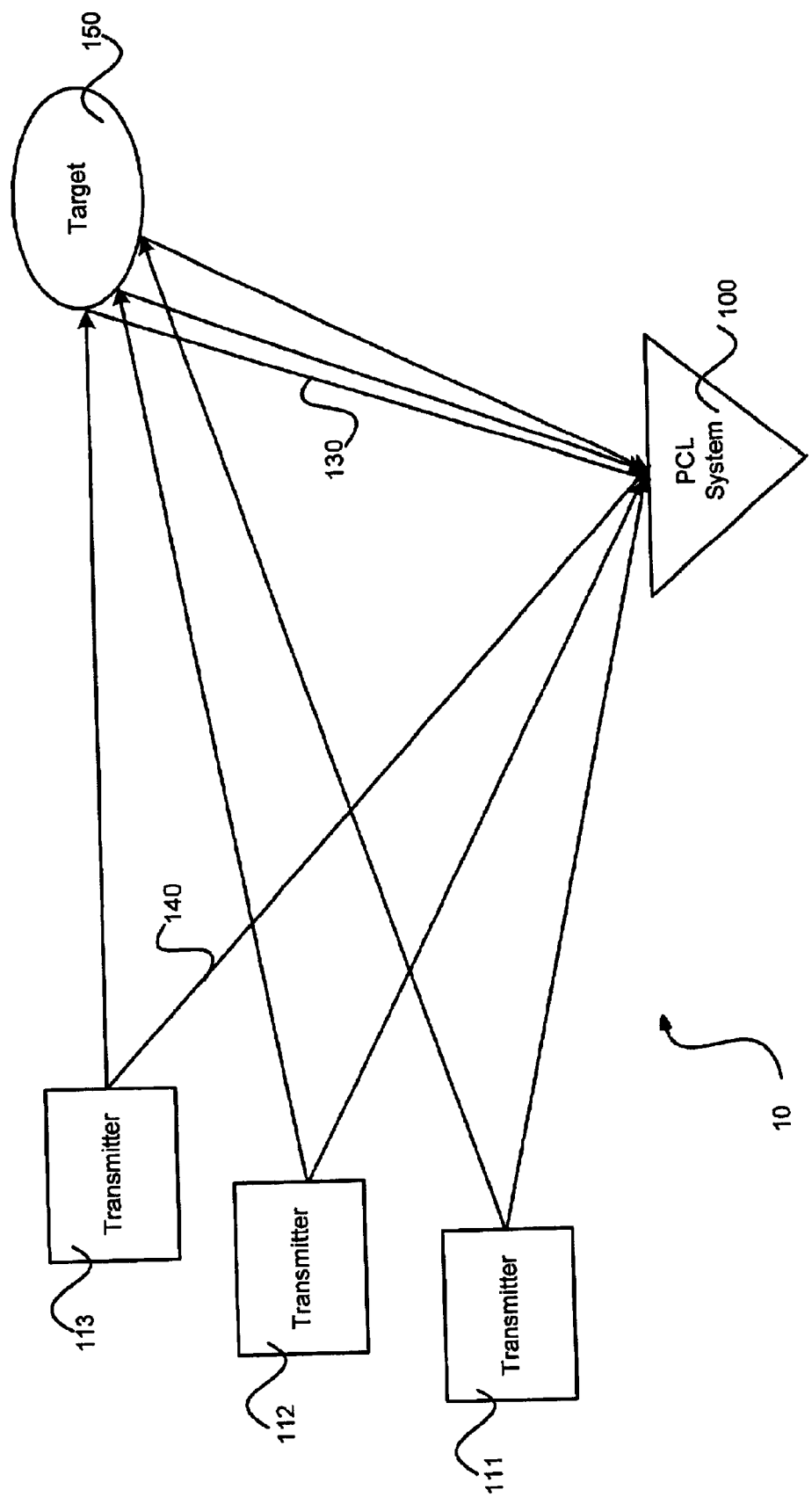
FIG. 1 illustrates a block diagram of a radar system, a target, and transmitters in accordance with an embodiment of the present invention.

FIG. 1 depicts a block diagram of a radar system, a target and transmitters in accordance with an embodiment of the present invention. Radar detection system 10 includes a PCL system 100, one or more targets of interest 150, and a plurality of transmitters 110, 112 and 114. PCL system 100 represents a family of multi-static wide area target surveillance sensors. PCL 100 system exploits continuous wave ("CW") electromagnetic energy, often from sources of opportunity that may be operating for other purposes. Sources of opportunity may include television broadcast stations and FM radio stations. Preferably, PCL system 100 may receive transmissions from a plurality of uncontrolled transmitters, also known as sources of opportunity, 110, 112, and 114. More preferably transmitters 110, 112, and 114 may be wideband sources of opportunity that include commercial FM broadcast transmitters and/or repeaters and commercial HDTV TV broadcast transmitters and/or repeaters. Transmitters 110, 112, and 114, however, are not limited to these sources of opportunity and may include any device, system or means to transmit uncontrolled signals.

Transmitters 110, 112, and 114 may transmit wideband electromagnetic energy transmissions in all directions. Some of these transmissions are reflected by one or more targets of interest 150 and received by PCL system 100. For example, reflected transmission 130 may be reflected by target 150 and received by PCL system 100. Further, with regard to transmitter 114, reference transmission 140 is received directly by PCL system 100. PCL system 100 may compare reference transmission 140 and reflected transmission 130 to determine positional information about one or more targets of interest 150. Reference transmission 140 also may be known as a direct path signal. Reflected transmission 130 also may be known as a target path signal. Positional information may include any information relating to a position of target 150, including location, velocity, and acceleration from determining a time difference of arrival ("TDOA"), a frequency difference of arrival ("FDOA") and an angle of arrival ("AOA").

Figure 2:
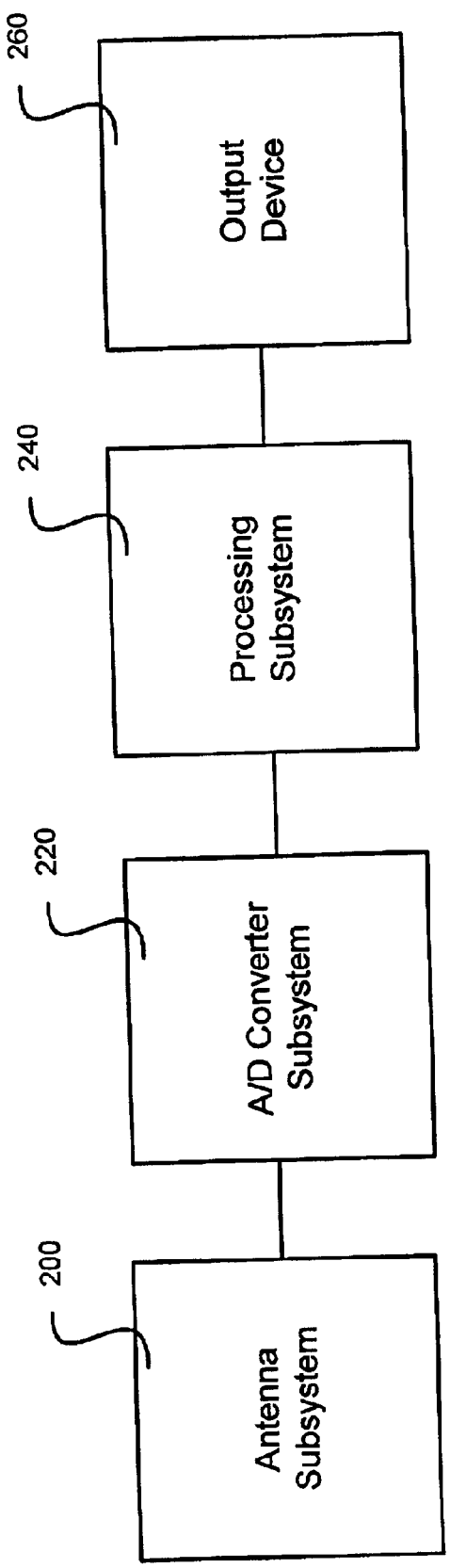
FIG. 2 illustrates a block diagram of a passive coherent location system in accordance with an embodiment of the present invention.

FIG. 2 depicts a block diagram of a passive coherent location system in accordance with an embodiment of the present invention. PCL system 100 may include antenna subsystem 200, analog to digital converter ("ADC") subsystem 220, processing subsystem 240, and output device 260. Antenna subsystem 200 receives electromagnetic energy transmissions, including reflected transmission 130 and reference transmission 140 of FIG. 1, with at least one antenna. Preferably, antenna subsystem 200 is an antenna array. ADC subsystem 220 receives the signal outputs of antenna subsystem 200 and outputs digital samples of the signals at its input by sampling the signals at a sampling rate and forming a digital waveform using the magnitude for the analog signal at each sampling interval. Processing subsystem 240 receives the output of assembly subsystem 220 and processes the signals for measurement data, tracking, target updates, and the like. Output device 260 receives the processing result and displays the output of processing subsystem 230.

Figure 3:
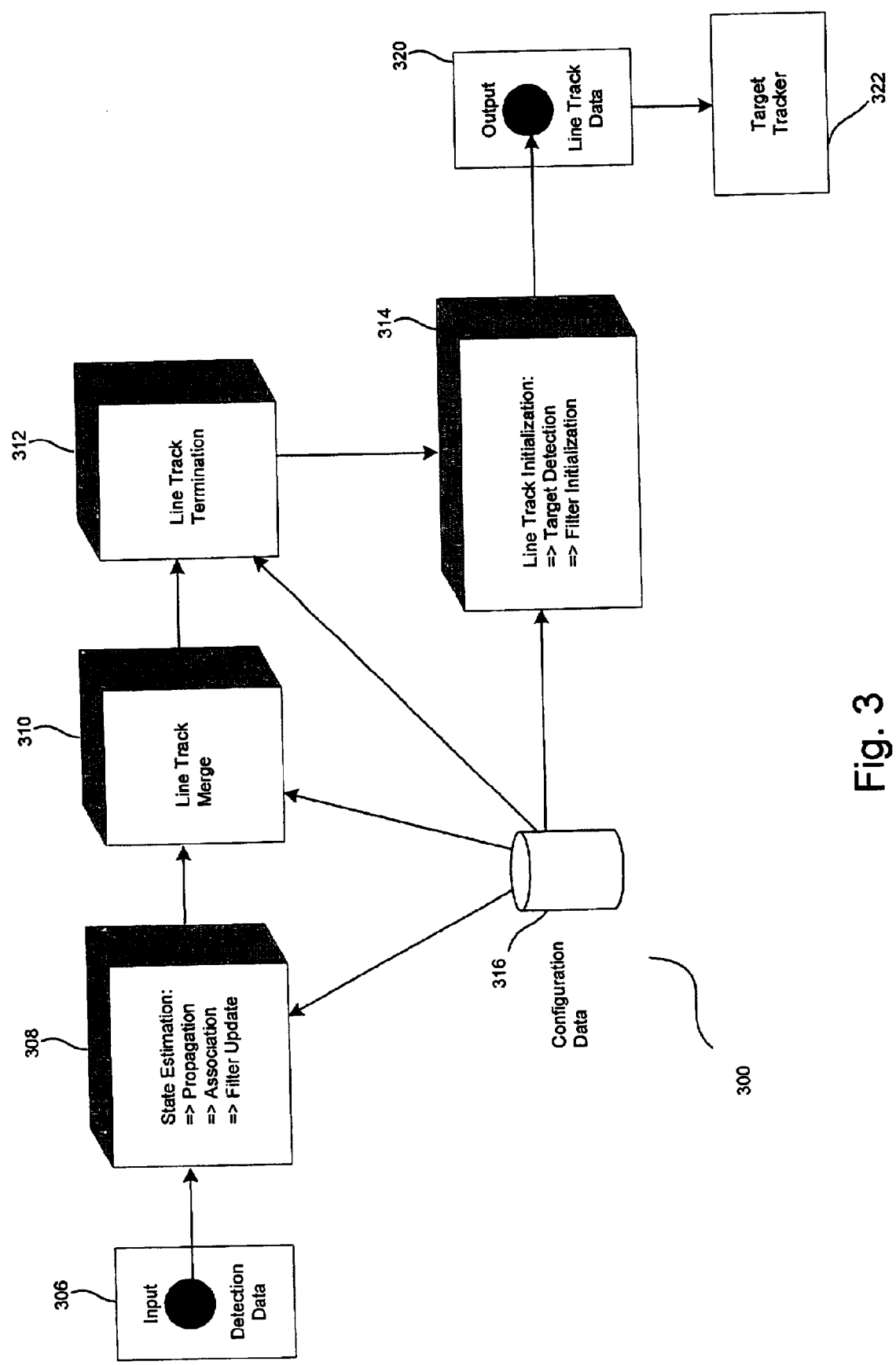
FIG. 3 illustrates a block diagram of a line track processing sub-system for measurement domain data association in accordance with an embodiment of the present invention.

FIG. 3 depicts a block diagram of a line track processing sub-system 300 for measurement domain data association in accordance with an embodiment of the present invention. Line track processing sub-system 300 may be incorporated in processing sub-system 240 of FIG. 2. Alternatively, line track processing sub-system 300 may be incorporated in ADC sub-system 220. Line track processing sub-system 300 is responsible for identifying strings of detections across multiple coherent processing intervals ("CPIs") and producing measurement space tracks of targets, such as target 150 of FIG. 1. As targets move in space, many signals may be reflected and received by PCL system 100. These different signals may be tracked to ensure that they are correlated to the correct target, and that existing tracks for detected targets are updated. Line track processing sub-system 300 seeks to facilitate that action by receiving detection reports from the signal processing function and outputting qualified line tracks to a line track association and target tracking function with processing subsystem 240.

Each processing cycle may begin with an input block 306 being input to line track processing sub-system 300 from a detection and feature extraction function. Input block 306 may include an input data block header that identifies the transmitter, the number of reports in the block, time tag of the block, and other parameters. Input block 306 also comprises detection reports generated by the detection and feature extraction function. Individual detection reports may contain measurements as well as the respective variances for the measurements. These measurements may include delay (FM), doppler (FM), relative frequency (TV), angle of arrival, signal power, the type of report, and the like. The "type of report" may be link known, illuminator unresolved, television carrier, and the like. Other input measurements or values may be noise floor for each detection report, illuminator and receiver, or link, identification, antenna identification, and the like.

The detection report measurements and variances may be converted, if needed, to the quantities desired in line track processing sub-system 300. The delay measurement may be the time difference of arrival ("TDOA") in seconds between the direct path signal and the target signal. The delay measurement may be converted to a bistatic range in meters. The doppler measurement may be the frequency difference of arrival ("FDOA") in Hertz ("Hz") between the direct path signal and the target signal. The doppler measurement may be converted to bistatic range rate in meters/sec.

Other measurement quantities may be unmodified. As discussed above, the angle-of-arrival ("AOA") may be the angle in radians between the target and the plane normal to the linear antenna array within antenna subsystem 200. The signal power measurement may be the power of the target signal referenced to the target antenna terminals, and may be measured in dBm.

Line track processing subsystem 300 also includes processing functions. The processing functions perform the high level processing for the tracking functions. State estimation function 308 receives the measurement data of input block 306, and propagates existing tracks in time to the current measurement time. This action allows the tracks to be synchronized with the data within input block 306. State estimation function 308 also estimates the updated states for the extending tracks.

Line track merge function 310 merges comparable line tracks extending from the same target. Line track termination function 312 terminates stale tracks. Line track initialization function 314 initiates new tracks for targets using certain unassociated detection reports. Configuration data 316 may provide pertinent configuration information on PCL system 100, or known illuminators, or transmitters, that enables the functions 308–314 to process and associate the measurement data of the detection reports within input block 306.

The line track processing subsystem 300 outputs line track records block 320 to the target tracking function of target tracker 322. Preferably, the raw measurements of the tracked detection reports along with their measurement variances and line tracking parameters may be forwarded to target tracker 322. The filtered or smoothed values of these measurements may not be forwarded. The line track metrics may indicate whether the track to be forwarded to target tracker 322 is application specific, and is a function of the measured, filtered and derived track attributes.

The following data may be included in output block 320. The data may be generated after processing each dwell of data. The data within output block 320 may comprise the number of peak detections for each illuminator, or transmitter. The data also may comprise the number of beams processed for each illuminator. The data also may comprise the associated time of the current update, the carrier frequencies for each illuminator, and the average RMS bandwidth of the reference signal for each illuminator.

The outputted data also may comprise a system noise figure for each beam processed for each illuminator. Further, the outputted data also may comprise the number of updated existing line tracks, the number of discontinued line tracks, and the number of new line tracks for the measurement data received in input block 306.

Output block 320 also may include detection reports that correlate to peak line tracks. The detection reports may contain the following data: data time, delay measurement and variance, Doppler measurement and variance, angle-of-arrival measurement and variance, signal power measurement and variance, signal-to-noise ("SNR") ratio, signal power referred to the antenna terminals, transmitter identification, line-track identification, and line track state.

Figure 4:
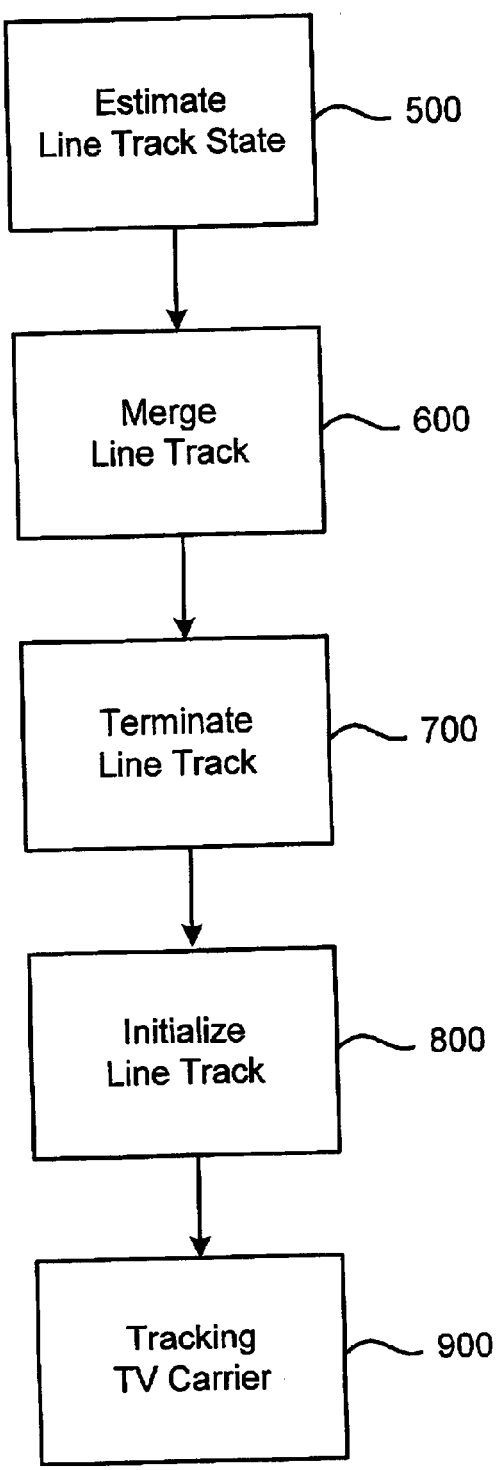
FIG. 4 illustrates a flowchart for processing line tracks in accordance with an embodiment of the present invention.

FIG. 4 depicts a flowchart for processing line tracks in accordance with an embodiment of the present invention. FIG. 4 indicates the various functions that may be associated with the line track processing algorithms, as disclosed below. The steps depicted in FIG. 4 disclose the line tracking processing algorithms in a preferred implementation sequence. Step 400 executes by estimating a line track state vector using a linear Kalman filter state estimation. Step 500 executes by merging line tracks associated with the same target. Step 600 executes by terminating those line tracks that meet certain conditions. Step 700 executes by initializing the line tracks selected to be forwarded to target tracker 322. Step 800 executes by tracking a television ("TV") carrier, if applicable.

Figure 5A:
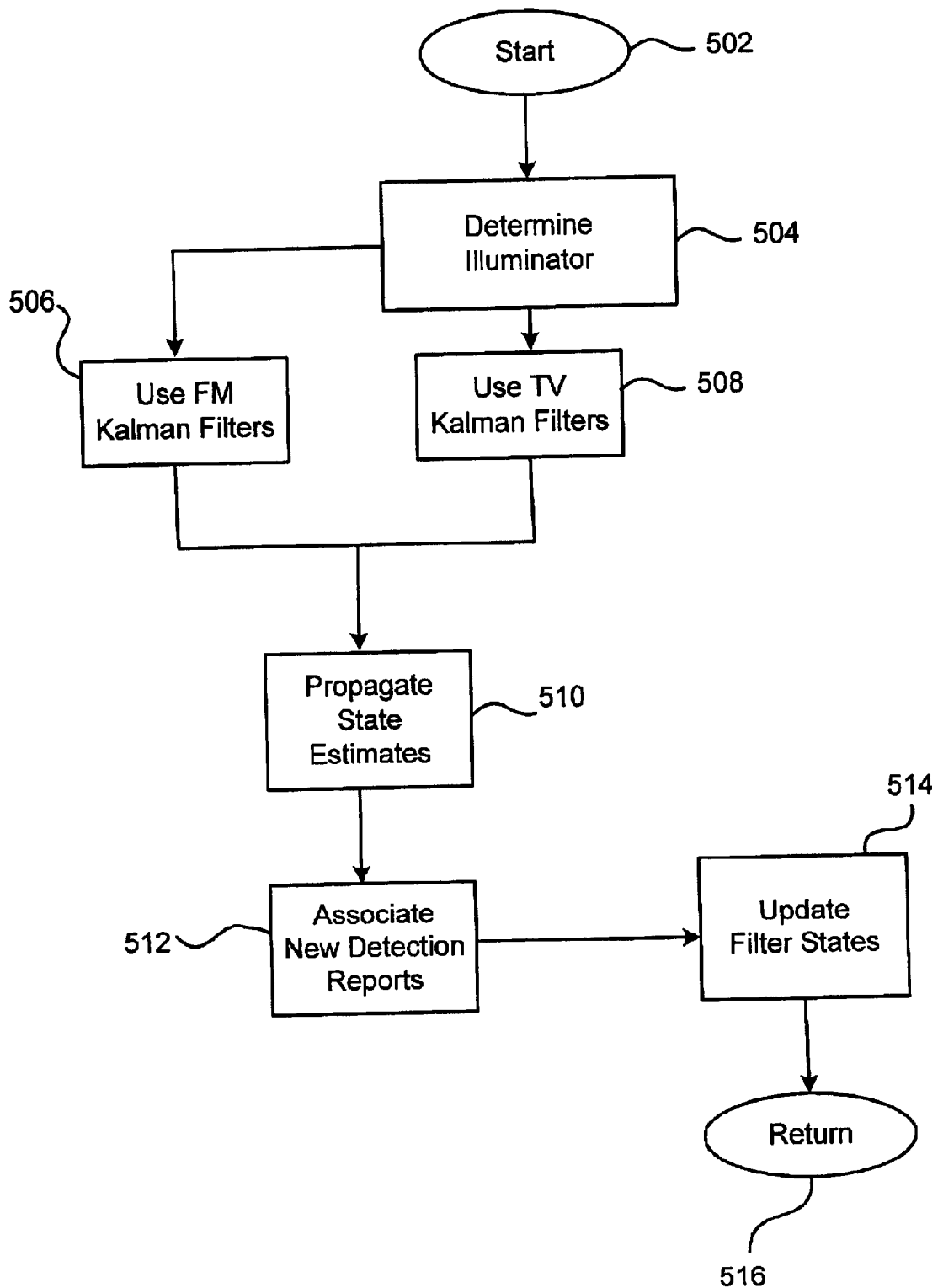
FIG. 5A illustrates a flowchart for estimating line track states in accordance with an embodiment of the present invention.

FIG. 5A depicts a flowchart for estimating line track states in accordance with an embodiment of the present invention. Line track state estimation may use separate Kalman filters to track range data and angel-of-arrival data in measurement space. In addition, simple smoothers may be used to track TV carriers and estimate signal power. Step 502 executes by starting the process disclosed in FIG. 4 by step 500. Step 500, however, is not limited to the embodiments disclosed with reference to FIGS. 5A and 5B.

Step 504 executes by determining what type of illuminator is being exploited. If the illuminator is a FM station, then PCL system 100 may associate the FM signals reflected from the target. If the illuminator is a TV station, then PCL system 100 may associate the television signals reflected from the target. Step 506 executes by using FM Kalman Filters. For FM illuminators, the state vectors for the range and angle-of-arrival Kalman Filters may given by $$X = \begin{bmatrix} r_b \\ \dot{r}_b \\ \ddot{r}_b \end{bmatrix} \text{ and } X = \begin{bmatrix} \theta \\ \dot{\theta} \end{bmatrix}, \text{ respectively.}$$

In the vectors, $r_b$ may be the differential bistatic range in meters, $\dot{r}_b$ may be the bistatic range rate in meters/sec, and $\theta$ may be the angle-of-arrival in radians. The relationship between the bistatic range and range rate states, on the one hand, and the fundamental measured quantities, $t_d$ ("TDOA"), or "delay", measured in seconds, and $f_d$ ("FDOA"), or doppler, measured in Hertz, on the other, may be given by $$rb = Ct_d$$
$$\dot{r}_b = -\lambda f_d$$

where c is the speed of light in vacuum, or 299792458 meters/sec, and $\lambda = c/f_c$ is the wavelength in meters of the illuminator's carrier, or center, frequency.

Step 508 executes by using TV Kalman Filters. For TV illuminators, the angle-of-arrival state vector may be identical to the FM case, but the range filter is replaced by a frequency filter. The replacement may be desired because the illuminator associated with the frequency line track may be ambiguous at this point of the processing. Therefore, constructing doppler from the frequency line track and its associated carrier line track may be uncertain. To handle this issue, doppler construction may be postponed so that the filter deals with the frequency track only. The state vectors for the frequency and angle filters may be given by $$X = \begin{bmatrix} f_r \\ \dot{f}_r \end{bmatrix} \text{ and } X = \begin{bmatrix} \theta \\ \dot{\theta} \end{bmatrix},$$

respectively, where $f_r = f - f_{LO}$ is the relative frequency with respect to the tuning LO frequency. After the carrier associated with this frequency line track has been identified, the relationship between bistatic range rate and the relative frequency disclosed above may be given by $$\dot{r}_b = -\lambda_c(f_r - (f_c - f_{LO})),$$

where $f_c$ is the carrier frequency and $\lambda_c$ is the carrier wavelength.

For either FM or TV signals, the angle filter may be present if angle data is available from the detector. Although the angle filter is a separate filter, it is coupled to either the range or frequency filter in several points through the line track processing functions, such as the line track birth and termination function, the line track merging function and in gating and computation of figures of merit ("FOM") and scores in the association process function.

Step 510 executes by propagating the state estimates for all line tracks forward to the current time dwell using $$\overline{X}_k = \Phi_{k-1} X_{k-1}$$

$$\overline{P}_k = \Phi_{k-1} P_{k-1} \Phi_{k-1}{}^T + Q_{k-1} \Delta t_{k-1}$$

where:

$\overline{X}_k$, $\overline{P}_k$ = propagated state vector and covariance at time $t_k$
$X_k$, $P_k$ = filtered state vector and covariance at time $t_k$
$\Delta t_{k-1} = t_k - t_{k-1}$ = (current time−last Kalman time)
$\Phi_{k-1}$ = state transition matrix from time $t_{k-1}$ to $t_k$ $\Phi_{k-1}$ = state transition matrix from time $t_{k-1}$ to $t_k$ $$= \begin{bmatrix} 1 & \Delta t_{k-1} & 0.5(\Delta_{t_{k-1}})^2 \\ 0 & 1 & \Delta t_{k-1} \\ 0 & 0 & 1 \end{bmatrix} \text{(three-state)}, \begin{bmatrix} 1 & \Delta t_{k-1} \\ 0 & 1 \end{bmatrix} \text{(two-state)}$$

$Q_{k-1}$ = process noise matrix over step from $t_{k-1}$ to $t_k$ $Q_{k-1}$ = process noise matrix over step from $t_{k-1}$ to $t_k$ $$= \begin{bmatrix} 0 & 0 & 0 \\ 0 & 0 & 0 \\ 0 & 0 & Q_{\dot{r}_b} \end{bmatrix}, \begin{bmatrix} 0 & 0 \\ 0 & Q_{\dot{f}_b} \end{bmatrix}, \text{ and } \begin{bmatrix} 0 & 0 \\ 0 & \frac{Q_{cr}}{3}\left(\frac{\Delta t_{k-1}}{R_{RT}}\right)^2 \end{bmatrix}$$

for the range, frequency, and angle-of-arrival filters. For ease of notation, X may denote any of the three filter types disclosed with reference to steps 506 and 508.

The filter used for tracking signal power in the line track processing subsystem 300 is an exponential filter disclosed as follows, where $P_{s,k}$ is the filtered signal power measurements in dBm at time $t_k$:

$$S = FOM(\theta) + FOM(f_r) + \frac{(\delta p_s)^2}{\text{var}(\delta p_s)} + A \cdot \ln\left[\frac{\text{var}(\delta f_r)\text{var}(\delta \theta)}{\text{var}(f_r^{(m)})\text{var}(\theta^{(m)})}\right]$$

where
$P_{s,0} = P_{s,0}{}^{(m)}$ (initialization)

$$\alpha_{k,m} = 1 - e^{-\frac{t_k - t_m}{\tau}}$$

$t_m$ = previous time measurement present for line track
$\tau$ = time constant of smoothing filter For the configurable parameters $\sqrt{Q_{\dot{r}_b}}$ and $\sqrt{Q_{cr}}$, in units of m/s$^{5/2}$, are the process noise sigmas for bistatic range rate—rate and cross range acceleration, respectively. The parameters may be used in the respective process noise matrices, Q, above. The parameter $R_{RT}$ in the angle-of-arrival Q matrix may be the estimated range from the receiver to the target and may be given by:

$$R_{RT} = \frac{r_b(r_b + 2R_{RI})}{2[R_{RI}(1 - \cos\gamma) + r_b]}$$

where:
$R_{RI}$ is the range in meters from the receiver to the illuminator,
$r_b$ is the bistatic range from the line track state,
$\gamma$ is the angle (rads) measured at the receiver between the illuminator bearing and the angle of arrival from the line track state.

For the TV case, the Q for the frequency filter is derived from the range rate—rate Q according to $$\sqrt{Q_{f_r}} = \frac{\sqrt{Q_{r_b}}}{\lambda_{LO}}$$

and the $R_{RT}$ parameter in the angle filter is set via a configuration parameter, $R_{RTTV}$.

Step 512 executes by associating new detection reports with existing line tracks. This process is disclosed in greater detail with reference to FIG. 5B. Step 516 executes by updating the filter states. For line tracks that were associated with detection updates in the current dwell, or process, the Kalman Filters associated with the line track are updated using the detection report's measurements as $$K_k = \bar{P}_k H^T [H \bar{P}_k H^T + R_k]^{-1}$$
$$X_k = \bar{X}_k + K_k (Z_k - H \bar{X}_k)$$
$$P_k = \bar{P}_k - K_k H \bar{P}_k$$

where:
$K_k$=Kalman gain matrix at time $t_k$
$Z_k$=new measurement vector at time $t_k$
$R_k$=measurement covariance matrix
H=measurement matrix $$Z_k = \begin{bmatrix} ct_d^{(m)} \\ -\lambda f_d^{(m)} \end{bmatrix}, R_k = \begin{bmatrix} c^2 \sigma_{t_d}^2 & 0 \\ 0 & \lambda^2 \sigma_{f_d}^2 \end{bmatrix}, H = \begin{bmatrix} 1 & 0 & 0 \\ 0 & 1 & 0 \end{bmatrix}$$

for the range filter
$Z_k = [f_r^{(m)}]$, $R_k = [\sigma_{f_r}^2]$, H=[1 0], for the frequency filter
$\sigma_{t_d}^2$=time delay measurement variance
$\sigma_{f_d}^2$=doppler measurement variance . . .
and with similar expressions for the angle filter. Step 516 executes by returning back to the line tracking processing functions.

Figure 5B:
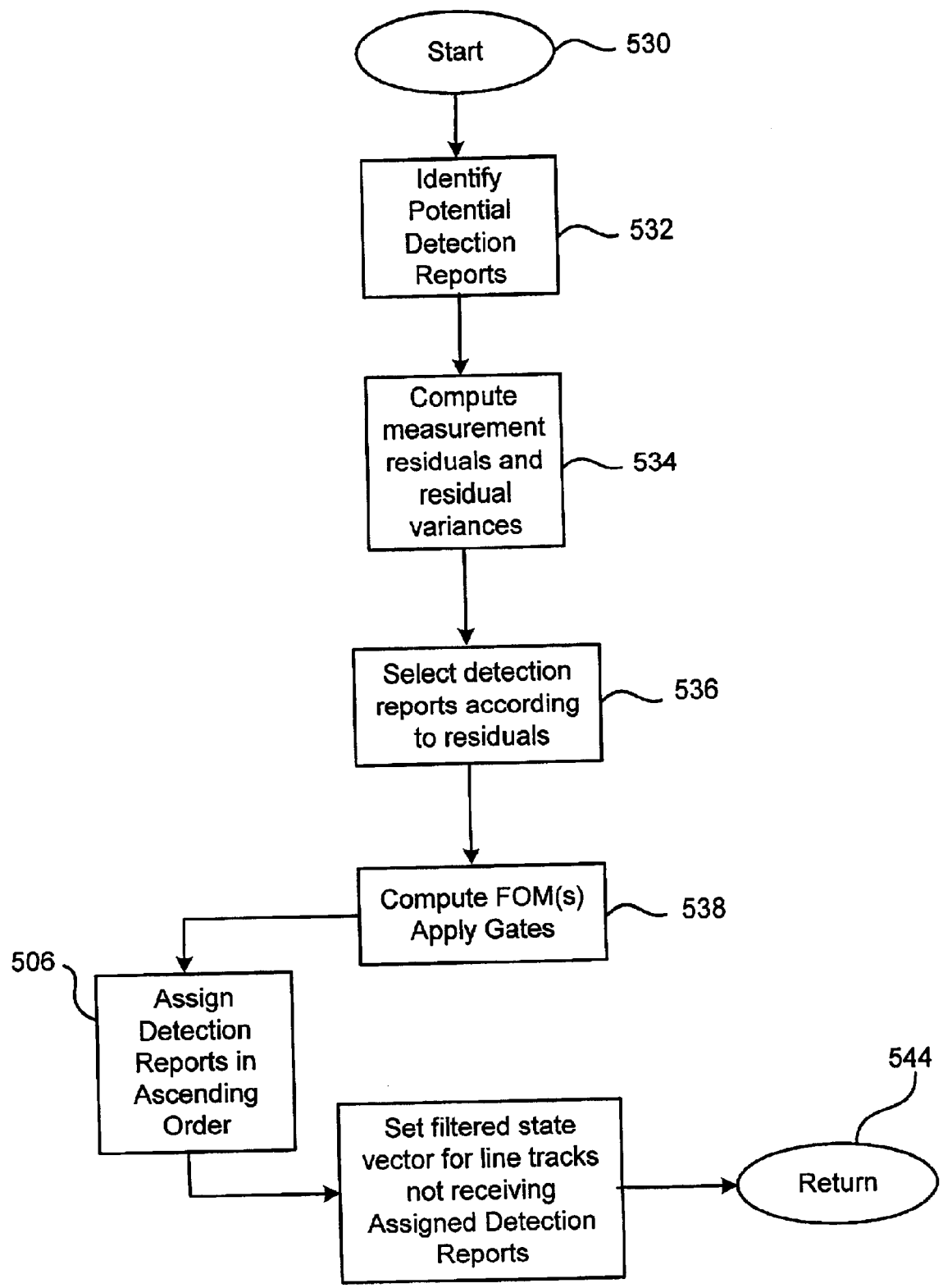
FIG. 5B illustrates a flowchart for detection association in estimating line track states in accordance with an embodiment of the present invention.

FIG. 5B depicts a flowchart for detection association in estimating line track states in accordance with an embodiment of the present invention. Step 530 executes by starting the process disclosed in FIG. 5 by step 512. Step 512, however, is not limited to the embodiments disclosed with reference to FIG. 5B. New detection reports may be associated with existing line tracks. A figure of merit ("FOM") may be computed for each detection report line track pair and used to eliminate unlikely combinations. A computed score for each surviving pair may be determined to identify those pairs that make the final association. Those detection reports having signal-to-noise ratios above a configured threshold may participate in the association function.

Step 532 executes by identifying the list of potential detection reports for association by comparing the detection's SNR to a configured threshold for each propagated line track. The equation for comparing the detection's SNR may be $SNR_i \geq \gamma_{LTE}$; i=1, . . . ,Q where $\gamma_{LTE}$=the line track extension threshold.

Step 534 executes by computing the appropriate measurement residuals for each measurement in the detection report and computing the corresponding approximate residual variances. The computations may be performed using the following equations. Please note that an FM signal may have a bistatic range, a bistatic range rate and an angle measurement, while a TV signal may have a relative frequency measurement. Both types of signals may have a signal power measurement.

The following equations may be used to compute the appropriate measurement residuals for each measurement:

$$\delta r_b = c t_d^{(m)} - r_b$$
$$\delta \dot{r}_r = -\lambda f_d^{(m)} - \dot{r}_b$$
$$\delta f_r = f_r^{(m)} - f_r$$
$$\delta \theta = \theta^{(m)} - \theta$$
$$\delta p_s = p_s^{(m)} - p_s$$

The following equations may be used to compute the corresponding approximate residual variances:

$$var(\delta r_b) = c^2 var(t_d^{(m)}) + var(r_b)$$
$$var(\delta \dot{r}_b) = \lambda^2 var(f_d^{(m)}) + var(\dot{r}b)$$
$$var(\delta f_r) = var(f_r^{(m)}) + var(f_r)$$
$$var(\delta \theta) = var(\theta^{(m)}) + var(\theta)$$
$$var(\delta p_s) = \sigma_{\delta p_s}^2 \text{ (configurable input)}$$

where the (m)-superscripts refer to the measurements from the detection report and $r_b$, $\dot{r}_b$, $f_r$, and $\theta$, and their variances, may be taken from the predicted Kalman filter states and covariance matrices at the current measurement time, $t_k$.

Step 536 executes by selecting as detection report to line track candidates those pairs whose residuals pass all gates. For example, the following relationship should be true for an FM line track with an angle measurement: $(|\delta r_b| < \epsilon_{r_b}) \wedge (|\delta \dot{r}_b| < \epsilon_{\dot{r}b}) \wedge (|\delta \theta| < \epsilon_\theta)$=TRUE where $\epsilon_{r_b}$, $\epsilon_{\dot{r}b}$, and $\epsilon_\theta$ may be the configurable residue gates for bistatic range, range rate and angle, respectively. An analogous test may be performed for other types of line tracks.

Step 538 executes by computing the appropriate FOM(s) and applying the gates. The FOMs for the gate test may be chosen from the following group: a 2-D spatial FOM($r_b$, $\theta$), and a 1-D range rate FOM($\dot{r}_b$) for FM illuminators with angle data; a 1-D frequency FOM($f_r$) and angle FOM($\theta$) for TV illuminators. These FOMs may be defined as follows:

$$FOM(r_b, \theta) = \frac{(\delta r_b)^2}{var(\delta r_b)} + \frac{(\delta \theta)^2}{var(\delta \theta)}$$

$$FOM(\dot{r}_b) = \frac{(\delta \dot{r}_b)^2}{var(\delta \dot{r}_b)}, \ldots$$

with similar definitions for the other 1-D FOMs. The FOMs should pass the corresponding thresholds, available in the configuration data 316 of FIG. 3, in order for the detection report to be eligible for subsequent association processing. The gates for the various FOMs may be as follows:

$$FOM(r_b, \theta) < \eta_{spatial}$$
$$FOM(\dot{r}_b) < \eta_{dop}$$
$$FOM(f_b) < \eta f_d$$
$$FOM(\theta) < \eta_\theta$$

If the appropriate thresholds are satisfied, the detection report is a candidate for association with the line track under test and its score may be calculated and used in subsequent association processing. For example, the score for a FM signal with an angle may be given by the following equation:

$$S = FOM(r_b, \theta) + FOM\left(\overset{\&}{r}_b\right) + \frac{(\delta p_s)^2}{\text{var}(\delta p_s)} +$$

$$A \cdot \ln\left[\frac{\text{var}(r_b) + \text{var}(r_b^*)}{\text{var}(r_b^*)} \cdot \frac{\text{var}\left(\overset{\&}{r}_b\right) + \text{var}\left(\overset{\&*}{r}_b\right)}{\text{var}\left(\overset{\&*}{r}_b\right)} \cdot \frac{\text{var}(\Theta) + \text{var}(\Theta^*)}{\text{var}(\Theta^*)}\right]$$

where A is an external input initially set to 1.0. For a TV signal with an angle, the score may be given by the following equation:

$$S = FOM(\theta) + FOM(f_r) + \frac{(\delta p_s)^2}{\text{var}(\delta p_s)} +$$

$$A \cdot \ln\left[\frac{\text{var}(f_r) + \text{var}(f_r^*)}{\text{var}(f_r^*)} \cdot \frac{\text{var}(\Theta) + \text{var}(\Theta^*)}{\text{var}(\Theta^*)}\right]$$

If no angle is given, the process may delete the corresponding angle terms in the above expressions.

$$\text{Where } \text{var}(f_r^*) = \frac{K_f^2}{T_{int}^2} \text{ and } SNR^* = 10^{.1 \times 14}$$

$$\text{var}(\Theta^*) = \frac{K_\Theta^2 \lambda^2}{D^2 SNR^*}$$

$$\text{var}(\Theta^*) = \frac{c^2 K_{t_2}^2}{B_{ref}^{*2} SNR^*} \text{ and } B_{ref}^{*2} = B_{IF}^2 \frac{\pi^2}{3}$$

$$\text{var}(r_b) = \frac{\lambda^2 K_{f_d}^2}{T_{int}^2 SNR^*}$$

Step 540 executes by assigning the detection reports in ascending order. By making assignments in ascending order, those combination are eliminated with higher scores that utilize newly assigned detection reports or line tracks. The assigned detection reports are used in the filter state update process disclosed in step 514. Step 542 executes by setting the filtered state vector for line tracks not receiving assigned detection reports. Specifically, the filtered state vector and covariance matrix is set equal to the propagated ones, or $X_k = \overline{X}_k$ $P_k = \overline{P}_k$. Step 544 executes by returning back to the line track estimating functions.

Figure 6:
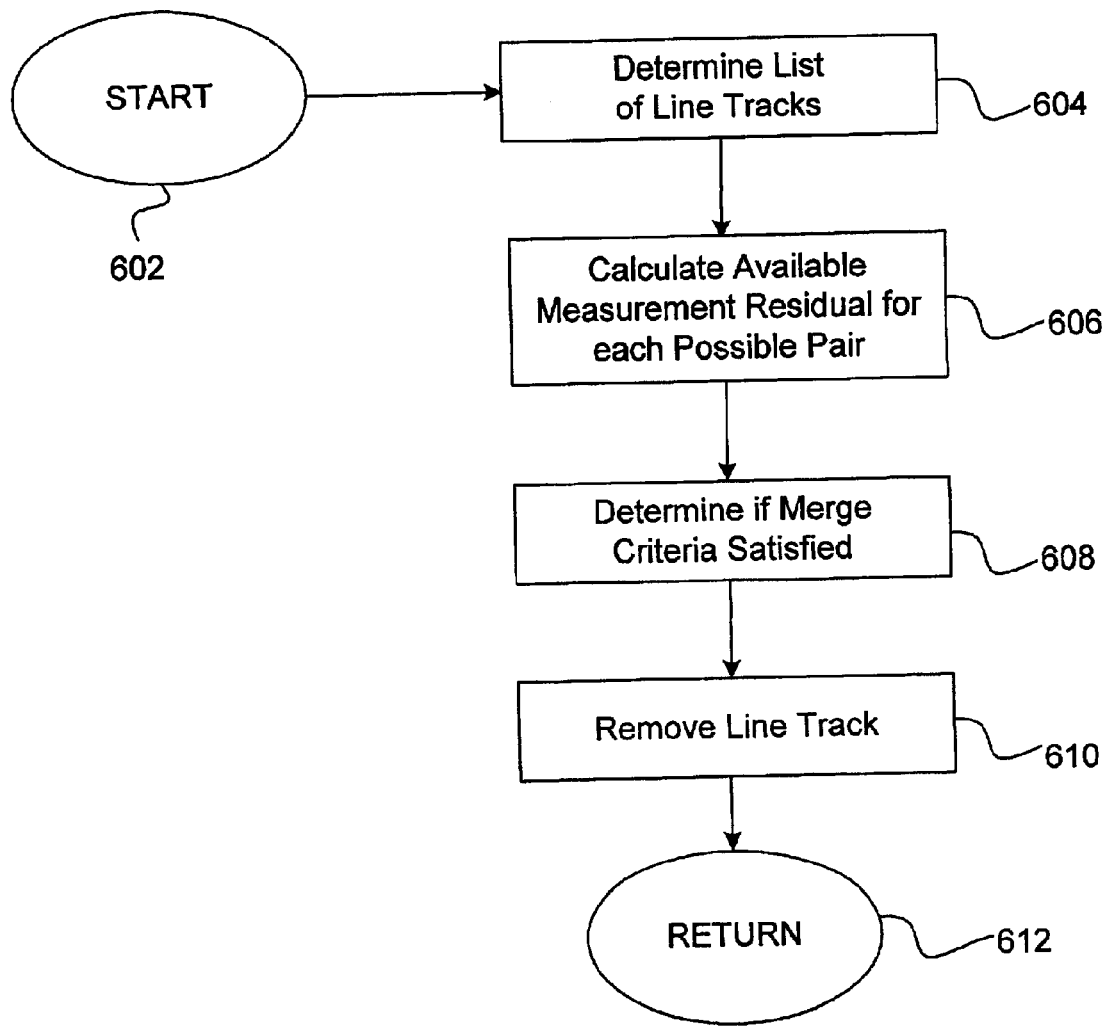
FIG. 6 illustrates a flowchart for merging line tracks in accordance with an embodiment of the present invention.

FIG. 6 depicts a flowchart for merging line tracks in accordance with an embodiment of the present invention. A line track merge process may be desired to combine multiple line tracks having detection reports that potentially originate from a single target. Merging actions may take place after the Kalman Filter update of step 514 has been performed for the current dwell update. The line track merge function element, such as line track merge function 310, may be enabled through the configuration switch $LT_{merge}$. Step 602 executes by starting the line track merging process disclosed by step 600 in FIG. 4. Step 600, however, is not limited to the embodiments disclosed with reference to FIG. 6.

Step 604 executes by determining a list of line tracks at the current dwell update. The list of line tracks may be given as $\{LT_i, i=1, \ldots, L\}$. Step 606 executes by calculating each available measurement residual for each possible line track pair in the list $\{LT_i, LT_j\}$, where $i \neq j$. The available measurement residual may be calculated by the following equation:

$$\delta z(i,j) = |z(i) - z(j)|$$

where z(i) represents any measurement for LT(i).

Step 608 executes by determining whether the criteria for merging line tracks is satisfied. If all measurement differences are smaller than their corresponding gates, then the merge criteria is satisfied. For example, for FM signals, if $$(\delta t(i,j) < \epsilon_{t_d}^M) \wedge (\delta f_d(i,j) < \epsilon_{f_d}^M) \wedge (\delta \theta(i,j) < \epsilon_\theta^M) = \text{TRUE}$$

where $\epsilon_{t_d}^M$, $\epsilon_{f_d}^M$, $\epsilon_\theta^M$ may be the configurable merge gates for delay, doppler and angle of arrival, respectively, then the merge criteria may be satisfied. Thus, step 610 executes by removing a line track from the list of active line tracks. Preferably, the younger of the two line tracks is removed. If the two line tracks are the same age, then the line track with the smaller initial SNR may be removed. Analogous processing may be implemented for TV signals from TV illuminators. Step 612 executes by returning to the line tracking processing functions.

Figure 7:
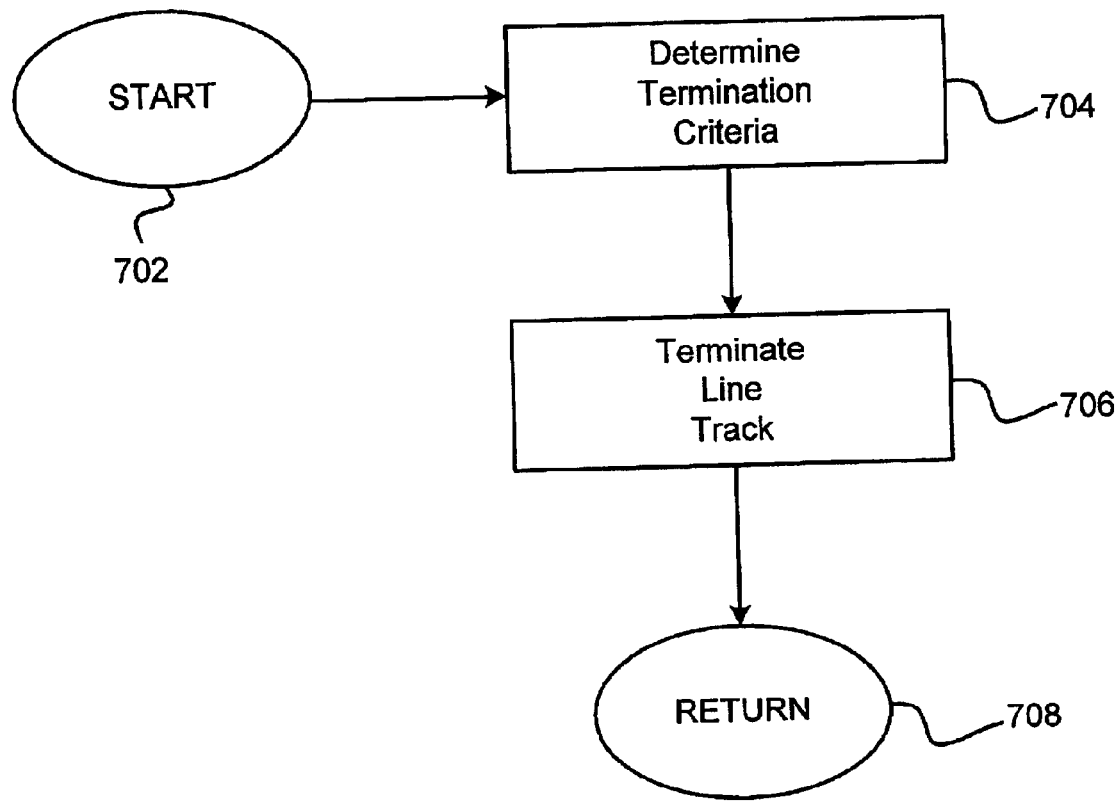
FIG. 7 illustrates a flowchart for terminating line tracks in accordance with an embodiment of the present invention.

FIG. 7 depicts a flowchart for terminating line tracks in accordance with an embodiment of the present invention. Step 702 executes by starting the line track termination process disclosed by step 700 in FIG. 4. Step 700, however, is not limited to the embodiments disclosed with reference to FIG. 7.

Step 704 executes by determining whether a termination criteria exists. Line track termination may occur for the following criteria. First, the line track has not been updated for $t_{idle}$ seconds. Second, the line track has not been updated for $U_{misses}$ consecutive dwell update opportunities. Third, the line track's filtered range rate rate at the current dwell update exceeds $\ddot{r}_{b,max}$. Fourth, the line track's associated doppler measurements have been less than $f_{d_{ZDE}}$ for more than $U_{ZDE}$ consecutive filter updates. Analogous processing may be applied for $f_r$ being near any of the carriers. The same configurable parameter may be used. Fifth, the line track has fewer filter updates than $U_{mature}$ and the ratio of track update opportunities to track updates above $\gamma_{MN}$ is greater than $P_{sparse}$. The last criteria only may apply in those instances when the line track initialization function 314 is performing M out of N detection, as disclosed below.

Step 706 terminates the line track identified by the above criteria. Line track termination removes old or stale line tracks from memory and frees up processing resources. Step 708 executes by returning back to the line tracking processing functions.

Figure 8A:
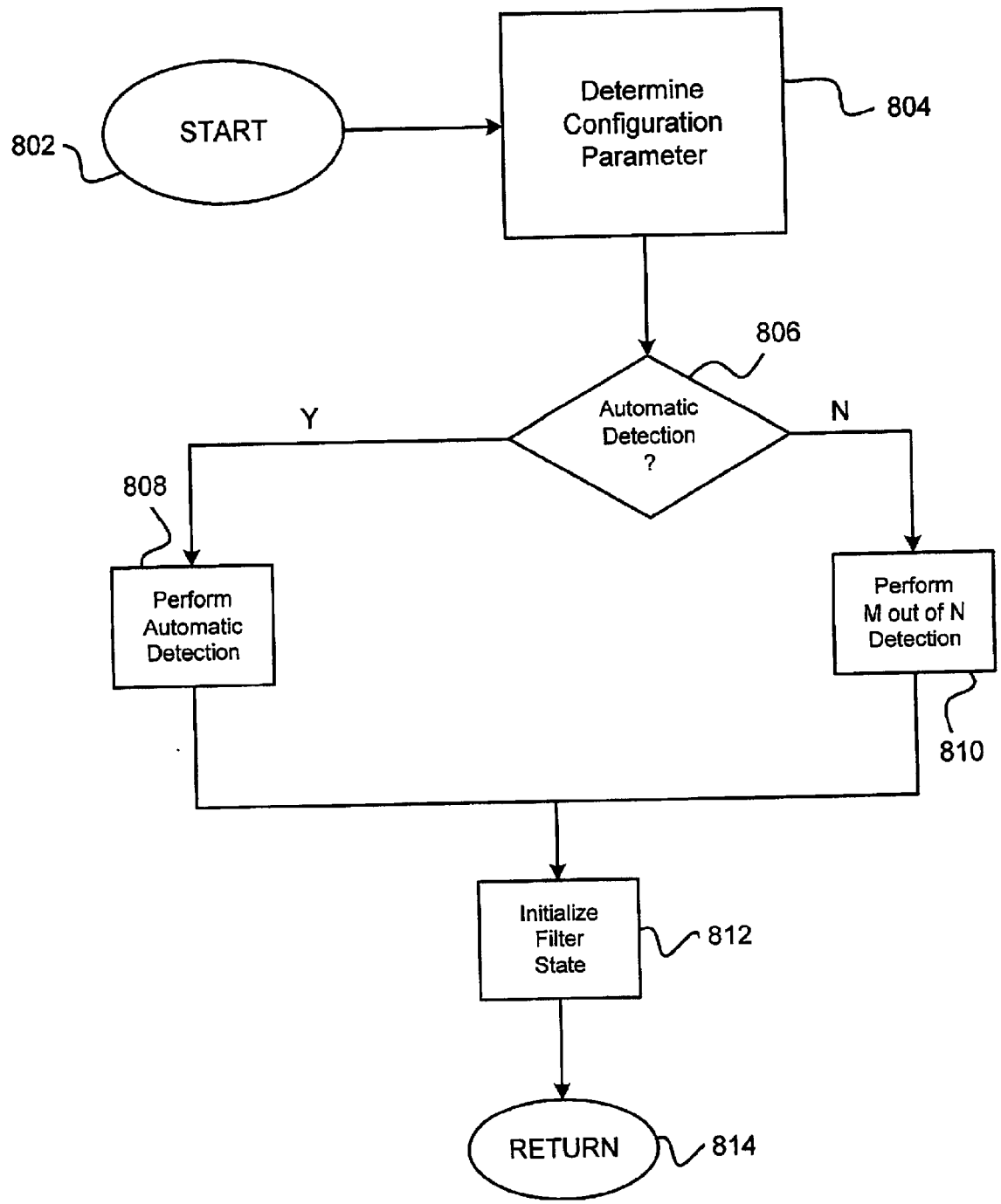
FIG. 8A illustrates a flowchart for initializing line tracks in accordance with an embodiment of the present invention.

FIG. 8A depicts a flowchart for initializing line tracks in accordance with an embodiment of the present invention. Two processes may exist for initializing line tracks. One process attempts to find target echoes in defined regions of the detection surface by integrating the energy found in the regions over a number of dwells and realizing a mature track. Another process starts immature line tracks from an initial detection above a specified threshold and requires a certain number and type of associations in subsequent dwells to claim maturity.

Step 802 executes by starting the line track initialization process disclosed by step 800 in FIG. 4. Step 800, however, is not limited to the embodiments disclosed with reference to FIGS. 8A, 8B and 8C. Step 804 executes by determining the configuration parameter for the process to be used in initializing the line tracks. A configuration parameter, $M_{LTI}$, may be used to control line track initialization. Preferably, the configuration parameter will denote one of the two processes disclosed above. Step 806 executes by determining whether the automatic detection process is indicated by the configuration parameter. If yes, then step 808 executes by performing an automatic detection process. The automatic detection process provides initial detection of possible targets by accumulating target echo energies over a period of time in predefined detection cells. The automatic detection process is disclosed in greater detail with reference to FIG. 8B.

If step 806 is no, then step 810 executes by performing the "M out of N" detection process. An "M out of N" detector may be implemented in this process. The M out of N detector may use the termination criteria, disclosed with reference to FIG. 7, to control which line tracks ultimately become mature tracks. New line tracks may be initiated on unassigned peak detections that have a SNR greater than $\gamma_{LTI}$ and an absolute doppler greater than $f_{d_{ZDF}}$.

Step 812 executes by initializing the filter state. Independent of the process used to initially detect a target, initialization of the line track Kalman filters may be performed. The number of new line tracks at each dwell update time may be limited by the configurable parameter, L. A unique line track identification and the following track filters may be initialized for the first L detections, or targets, as ordered by decreasing SNR.

For the bistatic range filter for a FM signal, the filtered state vector and covariance matrix may be initialized as $$X_k = \begin{bmatrix} ct_d^{(m)} \\ -\lambda f_d^{(m)} \\ 0 \end{bmatrix} \text{ and } P_k = \begin{bmatrix} c^2\sigma_{t_d}^2 & 0 & 0 \\ 0 & \lambda^2\sigma_{f_d}^2 & 0 \\ 0 & 0 & \sigma_{\dot{r}_b}^2 \end{bmatrix},$$

respectively.

For a TV signal, the covariance matrix for the frequency filter may be initialized as $$P_k = \begin{bmatrix} \sigma_{f_r}^2 & 0 \\ 0 & \left(\frac{\sigma_{\dot{r}_b}}{\lambda_{LO}}\right)^2 \end{bmatrix}.$$

For the angle of arrival rate filter, the filtered state vector and covariance may be initialized as $$X_k = \begin{bmatrix} \theta^{(m)} \\ 0 \end{bmatrix}, P_k = \begin{bmatrix} \sigma_\theta^2 & 0 \\ 0 & \sigma_{\dot\theta}^2 \end{bmatrix}.$$

The frequency filter may be initialized in an analogous manner.

Step 814 executes by returning back to the line tracking processing functions.

Figure 8B:
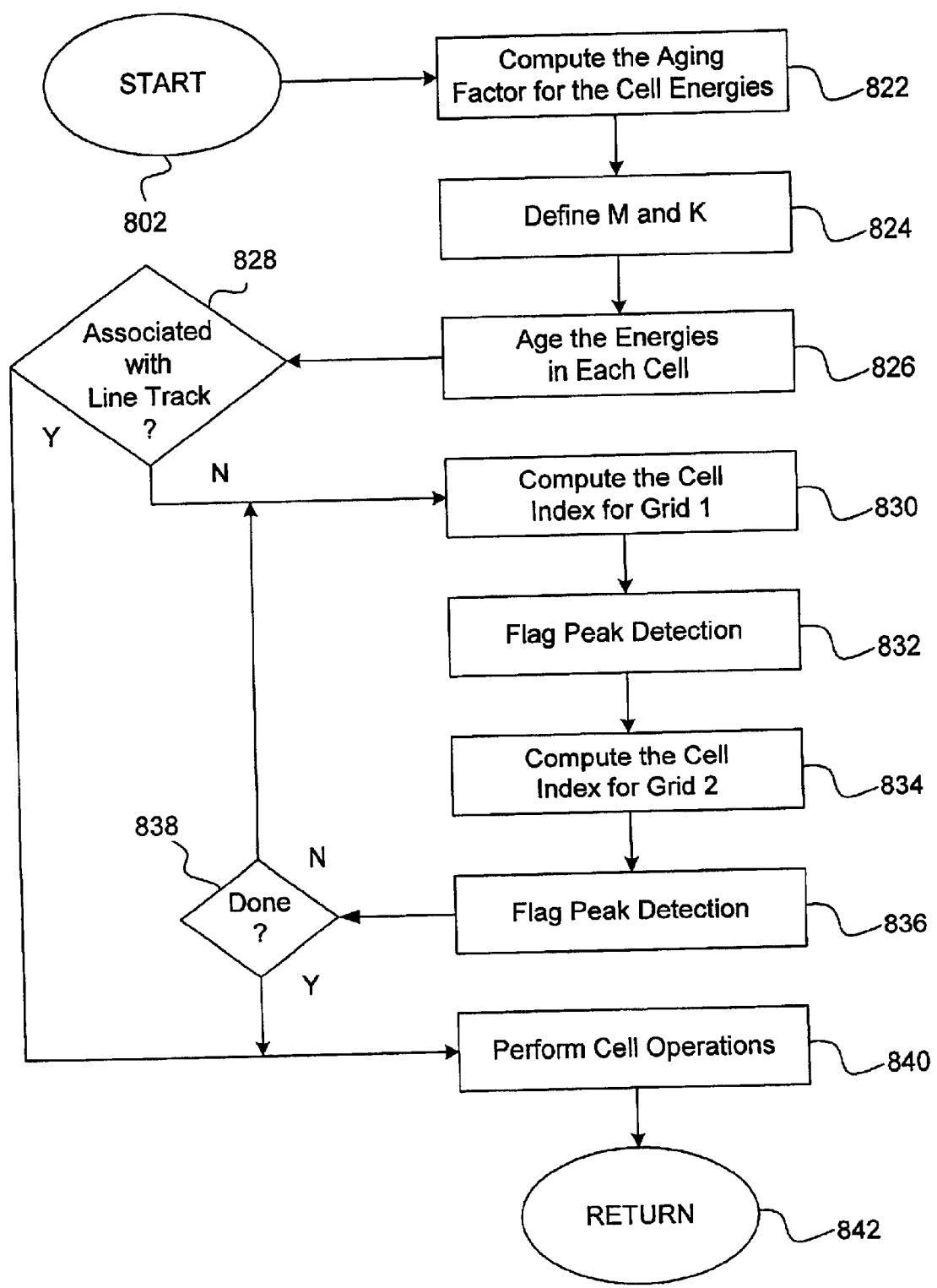
FIG. 8B illustrates a flowchart for initializing line tracks with an automatic detection process in accordance with an embodiment of the present invention.

FIG. 8B depicts a flowchart for initializing line tracks with an automatic detection process in accordance with an embodiment of the present invention. As disclosed above, the automatic detection process provides initial detection of possible targets by accumulating target echo energies over time in predefined detection cells. Peak detections that are not associated with an active line track in the current dwell update may be sent to the automatic detection process.

Step 820 executes by starting the automatic detection process disclosed by step 808 in FIG. 4. Step 808, however, is not limited to the embodiments disclosed with reference to FIGS. 8B and 8C. Step 822 executes by computing the aging factor for the cell energies. The aging factor may be computed as $$\alpha = e^{\frac{-0.6931\Delta t}{\tau_{auto\_det}}},$$

where $\Delta t$=the time difference between dwells and $\tau_{auto\_det}$= the automatic detection filter time constant. Step 824 executes by defining M and K. M may be the predefined number of doppler cells in the automatic detection grids. K may be the predefined number of delay cells.

Step 826 executes by aging the energies in each cell. The energies may be aged in each cell by the following equations:

$$\chi_1(m,k)=\alpha\chi_1(m,k) \ m=1,\ldots,M;k=1,\ldots,K$$

$$\chi_2(m,k)=\alpha\chi_2(m,k) \ m=1,\ldots,M;k=1,\ldots,K$$

Step 828 executes by determining whether a peak detection in the current dwell is associated with a line track. If no, then step 830 executes by computing the doppler and delay cell index for automatic detection grid 1 as $$(m_1, k_1) = NINT\left(\frac{f_d}{\delta_{t_d}}, \frac{t_d}{\delta_{f_d}}\right),$$

where NINT is the nearest integer function, $t_d$ and $f_d$ are the delay and doppler values of the peak detection in meters and meters/second, $\delta_{t_d}$ and $\delta_{f_d}$ are the cell widths of the automatic detection grids in delay and doppler.

Step 832 executes by flagging the peak detection as one associated with the cell in grid 1 if its SNR is greater than the one currently associated for this dwell. If so, return to step 830. Otherwise continue to step 834. Step 834 executes by computing the doppler and delay cell index for automatic detection grid 2 as $$(m_2, k_2) = NINT\left(0.5 + \frac{f_d}{\delta_{t_d}}, 0.5 + \frac{t_d}{\delta_{f_d}}\right).$$

Figure 8C:
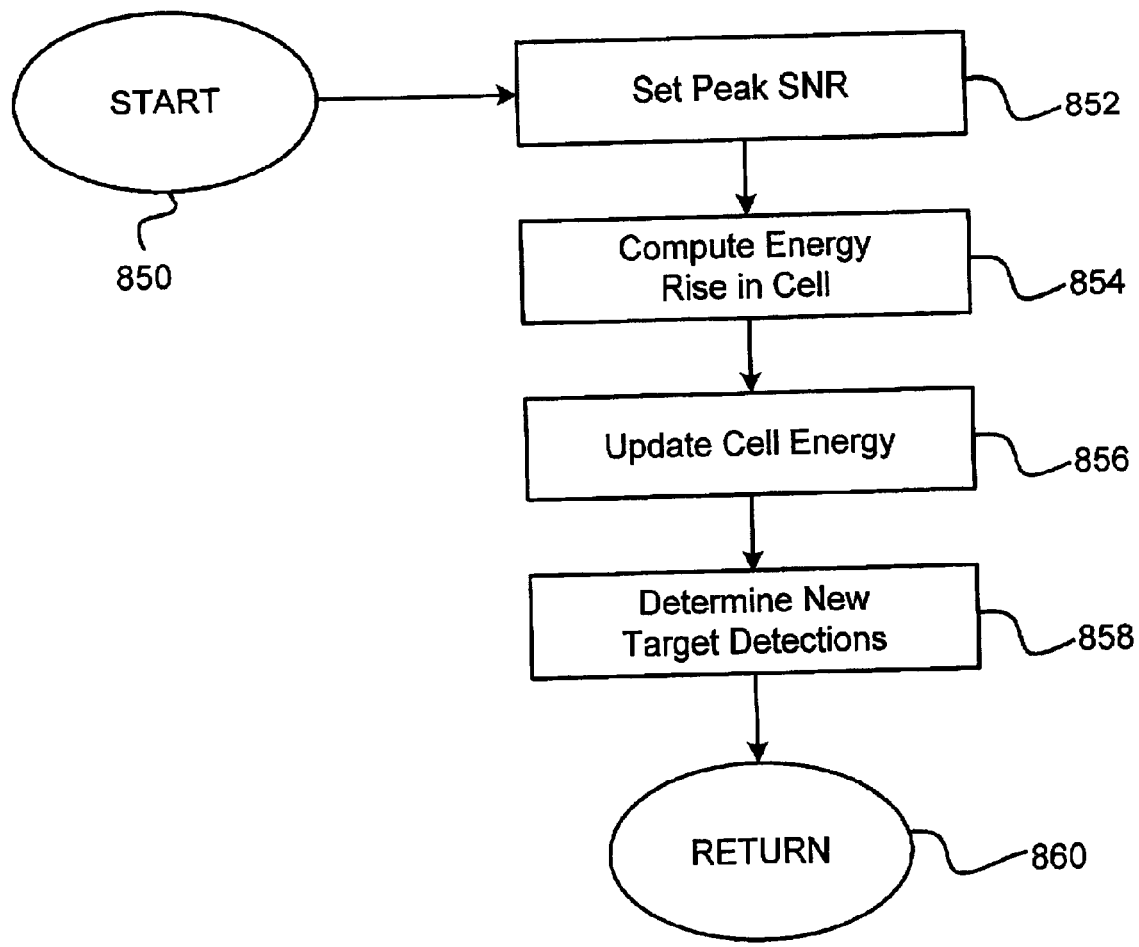
FIG. 8C illustrates a flowchart for performing cell operations on cells in the automatic detection grids in accordance with an embodiment of the present invention.

Step 836 executes by flagging the peak detection as the one associated with the cell in grid 2 if its SNR is greater than the one currently associated for this dwell. Step 838 executes by determining whether the list of detections is completed. If no, then return to step 830. If yes, then go to step 840. Further, if step 828 is yes, then step 840 executes by performing cell operations for each cell in each automatic detection grid generated above. FIG. 8C discloses this process in greater detail below. Step 842 executes by returning back to initializing the line tracks.

FIG. 8C depicts a flowchart for performing cell operations on cells in the automatic detection grids in accordance with an embodiment of the present invention. Step 850 executes by starting the cell operations process disclosed by step 840 in FIG. 4. Step 840, however, is not limited to the embodiments disclosed with reference to FIG. 8C. Step 852 executes by setting the peak SNR for each cell. $SNR_{peak}$ may be the SNR of the peak associated with the cell for the current dwell, if present. Step 854 executes by computing the energy rise of the cell. The energy rise may be computed as $\xi_{m,k}=(1-\alpha)SNR_{peak}$. The maximum rise may be limited by the property if $\xi_{m,k}>\xi_{max}$, then $\xi_{m,k}=\xi_{max}$ where $\xi_{max}$=the maximum energy rise in a cell for a dwell.

Step 856 executes by updating cell energy by $\chi(m,k)=\xi(m,k)+\xi_{m,k}$. Step 858 executes by determining new target detections. New target detections may be determined by comparing the cell energy against the line track initiation threshold. If $\chi(m,k)>\gamma_{auto\_det}$, then a new line track may be started and the energy in the cell may be zeroed out, or $\chi(m,k)=0.0$, where $\gamma_{auto\_det}$=the line track initialization threshold. Step 860 executes by returning back to the automatic detection process.

Referring back to FIG. 3, step 900 discloses carrier tracking for TV signals associated with a TV illuminator. A stream of detection reports may be identified with the TV signal's video carrier signal. These reports have been tagged as such in detection processing because they have originated on the reference beam for the TV illuminator and their measured relative frequency has fallen within the specified window for the carrier. If no carrier tracking is desired, no detection reports may be tagged as such, and the carrier track may remain at its initialized value, or a configurable input.

For each carrier, a smoothing filter may be defined as $$f_{c,k} = \begin{cases} f_{c,k-1} + \beta_{k,m}(f_{c,k}^{(m)} - f_{c,k-1}) & \text{measurement present} \\ f_{c,k-1} & \text{no measurement present} \end{cases}$$

where
$f_{c,0}$=(configuration input)

$$\beta_{k,m} = 1 - e^{-\frac{t_k - t_m}{\tau_c}}$$

$t_m$=previous time measurement present for carrier track
$\tau_c$=time constant of smoothing filter The measurement selected is the measurement whose SNR exceeds the carrier tracking threshold, is within the carrier search window, and has the minimum measurement residual.

Thus, in accordance with the disclosed embodiments, a system and method for measurement domain data association is disclosed. Another name for the system and method may be line tracking. The disclosed embodiments receive detection reports as input and associates the detection reports with existing line tracks, creates new line tracks or terminates line tracks according to the data within the detection reports. The detection reports contain data for signals reflected from potential targets that are being tracked by the PCL system. The disclosed methods, processes and algorithms improve line tracking and outputs line track data to the target tracking function. Therefore, targets may be identified and tracked in a more efficient manner.

It will be apparent to those skilled in the art that various modifications and variations can be made in the disclosed embodiments of the present invention without departing from the spirit or scope of the invention. Thus, it is intended that the present invention embodies the modifications and variations of this invention provided that they come within the scope of any claims and their equivalents.

What is claimed is:

1. A method for associating a detection report having measurements to a line track, wherein said line track correlates to a signal transmitted from a source of opportunity, reflected from a target, and detected by a passive coherent location system, comprising:
    estimating a line track state vector from said measurements using a set of Kalman filters wherein said measurements are at least partially derived by comparing said signal to a reference transmission from said source of opportunity; and
    initializing said line track.

2. The method of claim 1, further comprising merging said line track with another line track associated with said target.

3. The method of claim 1, further comprising terminating said line track.

4. The method of claim 1, further comprising selecting said set of Kalman filters.

5. The method of claim 1, wherein said set of Kalman filters includes range and angle-of-arrival Kalman filters.

6. The method of claim 1, wherein said set of Kalman filters includes frequency and angle-of-arrival Kalman filters.

7. The method of claim 1, wherein said estimating includes propagating state estimates for said line track.

8. The method of claim 1, further comprising determining whether said signal is a FM signal.

9. The method of claim 1, further comprising determining whether said signal is a TV signal.

10. The method of claim 9, further comprising tracking a carrier of said TV signal.

11. The method of claim 1, further comprising updating filter states of said Kalman filters.

12. A method for associating measurement data to a line track correlating to a target, wherein a target signal is reflected from said target and is received by a passive coherent location system, comprising:
    determining a signal type for said signal;
    converting said measurement data to filter data according to said signal type;
    selecting a set of Kalman filters for said filter data according to said signal type;
    propagating said line track;
    identifying a detection report for said line track according to said measurement data;
    computing measurement residuals and residual variances for said detection report according to said Kalman filters; and
    selecting said detection report for association with said line track according to said residuals.

13. The method of claim 12, further comprising initializing line track filter states of said line track.

14. The method of claim 13, further comprising merging said line track with another line track when a merge criteria is satisfied.

15. The method of claim 14, further comprising determining said merge criteria according to said residuals.

16. The method of claim 13, further comprising terminating said line track when a termination criteria is satisfied.

17. The method of claim 16, further comprising determining said termination criteria.

18. The method of claim 12, wherein said identifying comprises comparing a signal-to-noise ratio of said detection report to a configured threshold for said line track.

19. A system for measurement data association of detection reports to a line track within a passive coherent location system, wherein said detection reports correlate to target signals transmitted from a source of opportunity, reflected from a target, and received at said passive coherent location system, comprising:
    a state estimation means to associate new detection reports with existing line tracks and to estimate update states for extending line tracks, wherein said new detection reports are at least partially derived by comparing said target signal to a reference transmission from said source of opportunity;
    a line track merge means to merge line tracks;
    a line track termination means to terminate line tracks according to a specified criteria; and
    a line track initialization means to initiate new line tracks for unassociated detection reports.

20. The system of claim 19, further comprising configuration data accessible by said means.

21. The system of claim 19, wherein said state estimation means receives an input block comprising said detection reports.

22. The system of claim 21, wherein said detection reports comprise measurements.

23. The system of claim 22, wherein said detection reports comprise variances for said measurements.

24. The system of claim 22, wherein said measurements are used by said state estimation means in associating said detection reports.

25. The system of claim 19, wherein said state estimation means includes Kalman filters for range, frequency and angle-of-arrival.

26. The system of claim 19, further comprising an output block.

27. The system of claim 26, wherein said output block comprises line track records.

28. The system of claim 26, wherein said output block comprises measurements.

29. A method for estimating line track states with detection association in a passive coherent location system, wherein said passive coherent location system receives target signals reflected from targets, said target signals having measurement values, comprising:

identifying a set of potential detection reports, wherein said detection reports comprises measurement values;

computing measurement residuals and residual variances for said measurement values;

selecting candidate detection reports for line tracks from said set of potential detection reports according to said measurement residuals;

applying thresholds to said candidate detection reports; and associating said candidate detection reports passing said thresholds to said line tracks.

30. The method of claim 29, wherein said applying includes computing a figure-of-merit for each of said candidate detection reports.

31. The method of claim 29, wherein said identifying includes comparing a signal-to-noise ratio for each of said set of detection reports to a configured threshold.

32. A method for associating new detection reports with existing line tracks in a passive coherent location system, comprising:

gating a detection report-line track pair;

computing a score for said detection report-line track pair; and assigning a detection report of said detection report-line track pair to a line track of said detection report-line track pair according to said score.

33. The method of claim 32, further comprising identifying said detection report according a signal-to-noise ratio measurement.

34. The method of claim 32, further comprising selecting said detection report-line track pair.

35. A method for merging line tracks within a passive coherent location system, wherein said line tracks correlate to a target, comprising:

determining a list of line tracks and line track pairs;

calculating a measurement residual for each line track pair within said list;

determining merge criteria for said each line track pair;

comparing said measurement residual with gates correlating to said merge criteria; and removing a line track from said each line track pair that satisfies said merge criteria.

36. The method of claim 35, wherein said removed line track is younger than another line track within said each possible line track pair.

37. The method of claim 35, wherein said removed line track has a lower initial signal-to-noise ratio than another line track within said each possible line track pair.

38. A method for terminating a line track within a passive coherent location system, wherein said line track correlates to a target signal transmitted from one or more sources of opportunity, reflected from a target, and received by said passive coherent location system, comprising:

determining a termination criteria;

monitoring said line track using comparison data from said target signal and a reference transmission from said source of opportunity; and terminating said line track when said line track achieves said termination criteria.

39. A method for initializing new line tracks within a passive coherent location system, comprising:

determining a configuration parameter for a new line track;

selecting an initialization process according to said configuration parameter;

performing said initialization process; and initializing a filter state of said new line track.

40. The method of claim 39, wherein said performing includes performing an automatic detection process by accumulating target echo energies in predefined detection cells correlating to said new line track.

41. The method of claim 39, wherein said performing includes performing an M out of N detection process by maturing said new line track when said new line track satisfies a predetermined criteria.

* * * * *